F. C. SEAMAN.
ROLLER BEARING.
APPLICATION FILED SEPT. 19, 1913.

1,101,716.

Patented June 30, 1914.
2 SHEETS—SHEET 1.

Witnesses
Robert M. Sutphin
A. I. Hind

Inventor
F. C. Seaman.

By Watson E. Coleman
Attorney

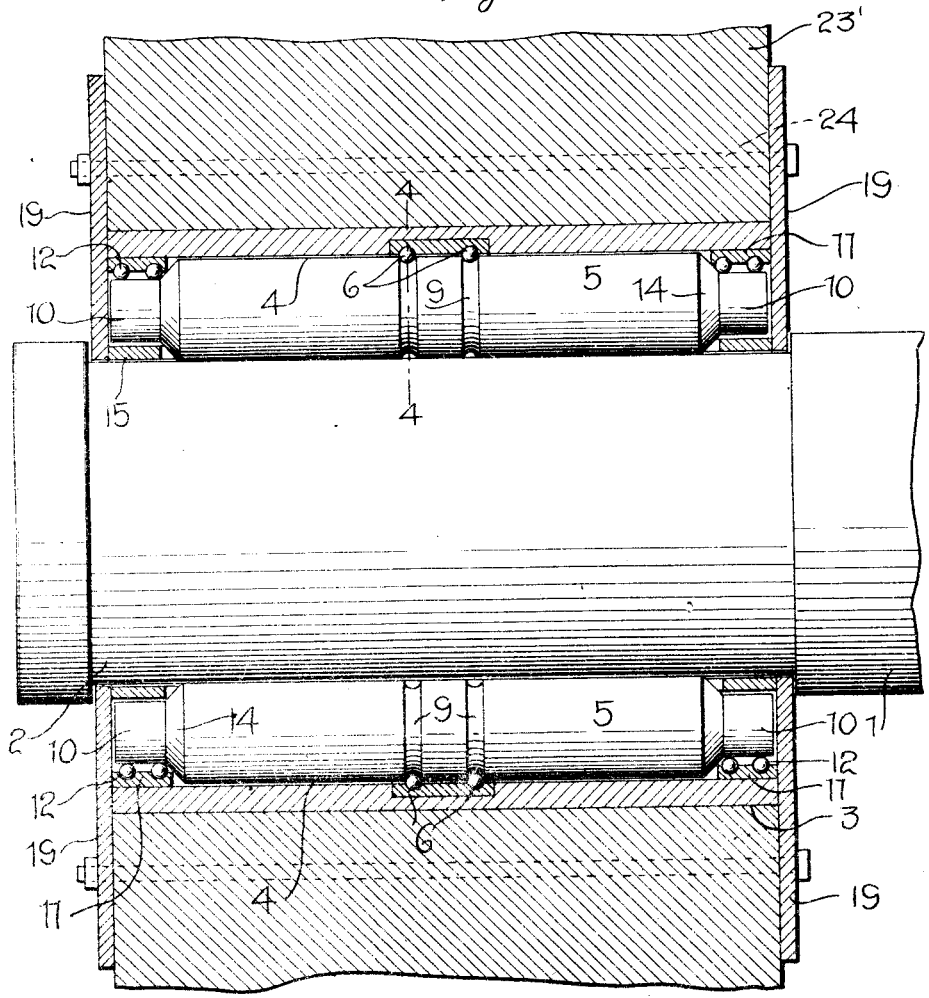
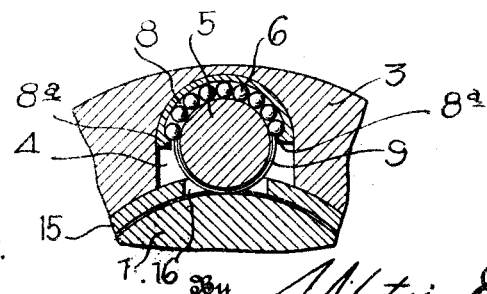

UNITED STATES PATENT OFFICE.

FRANK CARYLE SEAMAN, OF ONEONTA, NEW YORK, ASSIGNOR OF ONE-HALF TO BOWEN C. DONELESON, OF ONEONTA, NEW YORK.

ROLLER-BEARING.

1,101,716.   Specification of Letters Patent.   Patented June 30, 1914.

Application filed September 19, 1913. Serial No. 790,689.

*To all whom it may concern:*

Be it known that I, FRANK C. SEAMAN, a citizen of the United States, residing at Oneonta, in the county of Otsego and State of New York, have invented certain new and useful Improvements in Roller-Bearings, of which the following is a specification, reference being had to the accompanying drawings.

This invention relates to certain improvements in roller bearings for axles or the like, and the object of the invention is to provide a novel and improved device of this general character having effective means whereby the amount of friction between the bearings, the axle or shaft and the hub or box is reduced to a minimum.

The invention consists in the details of construction and in the combination and arrangement of the several parts whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1:
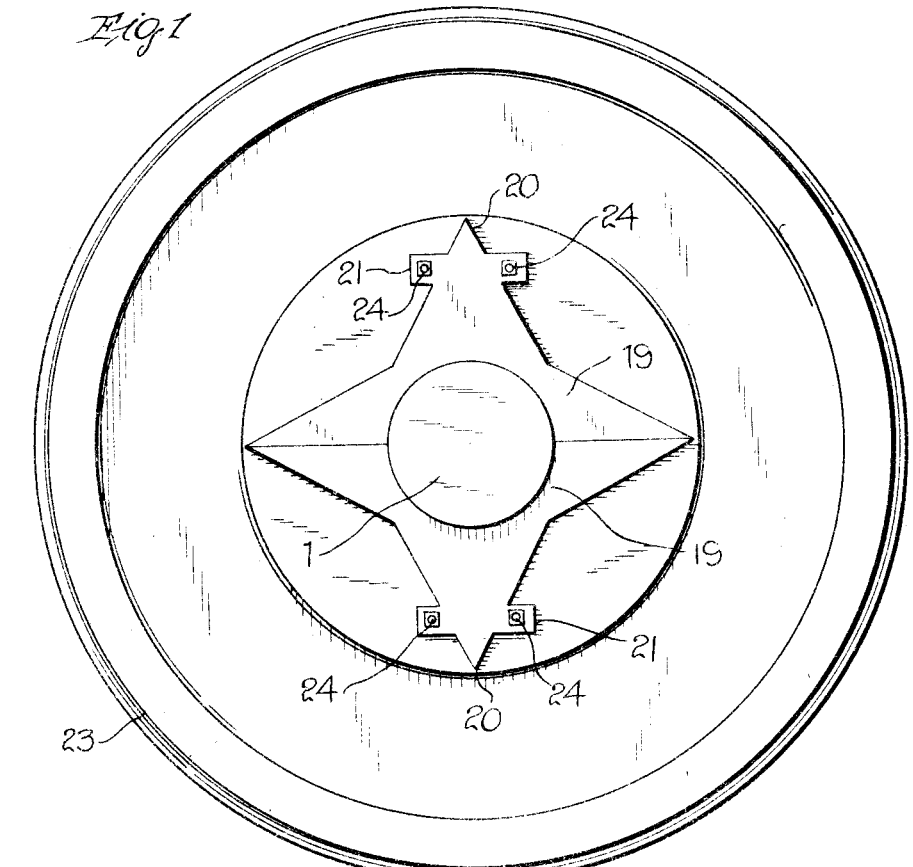
Figure 2:
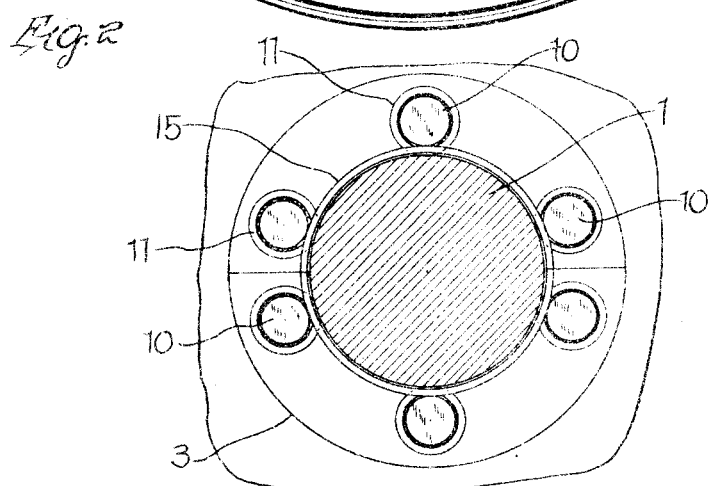

Figure 1 is a view in side elevation illustrating a car wheel with a bearing constructed in accordance with my invention applied thereto; Fig. 2 is a fragmentary transverse sectional view taken through the supporting axle or spindle and illustrating the adjacent parts of the bearing; Fig. 3 is a longitudinal sectional view taken substantially centrally through Fig. 2; and Fig. 4 is a fragmentary sectional view illustrating certain details of my invention, as herein disclosed.

As disclosed in the accompanying drawings, I set forth an embodiment of my invention as applied to a car axle and as therein illustrated, 1 denotes an axle of any ordinary or preferred construction reduced, as at 2, to afford a spindle to accommodate the hub 3, which hub is preferably divided longitudinally into a plurality of sections and is herein shown as comprising two of such sections. Produced in the inner face of the hub 3 and directed longitudinally thereof are the grooves or channels 4—4 in which are adapted to be seated the bearing rollers 5, such bearings 5—5 being held against endwise movement through the medium of the anti-friction members 6—6, herein shown as spherical bodies resting in the segmental race members 8—8 suitably positioned in the walls of the grooves or channels and extended transversely thereof, such spherical bodies being also extended within the annular grooves or channels 9—9 correspondingly produced in the bearings in a manner which is believed to be obvious. It is to be observed that the ends of the segmental members 8 are provided with the inwardly directed projections 8ª whereby the anti-friction members 6—6 are operatively maintained in position when applied. To further reduce the friction between the bearing rollers and the hub, I have the end portion of each of such bearings reduced, as indicated at 10, such reduced portions being embraced by the sleeves 11 suitably fixed in the end of the hub and being provided with suitable race ways to accommodate the anti-friction members 12—12 adapted to contact with such reduced portions 10.

The bore of the hub is provided with a brass lining 15 also formed of a plurality of sections and adapted to hold the bearings or rollers 5 against displacement, such lining being provided with the elongated slots 16 of less transverse diameter than the adjacent portions of the bearings or rollers 5 and through which the bights of such rollers are adapted to project in order to properly contact with the spindle 2. As herein disclosed, the hub 3 is adapted to rotate with the wheel proper and as herein set forth, such hub is provided at its opposite ends with the outwardly directed flanges 19—19 of any proper configuration but herein set forth as in the simulation of a four-pointed star and each of the points 20 are herein shown as provided with the oppositely disposed laterally projecting extensions or ears 21. The flanges 19 are adapted to bear snugly against the web of the wheel 23 and clamping rods 24 are adapted to extend through the projections 21 and the web 23' whereby the flanges 19 are so held to the web 23' as to cause the hub to rotate with the wheel proper. As herein set forth the wheel is provided, as is believed to be apparent with a solid web but it is also thought to be obvious that should the wheel be provided with spokes that the points 19 can be suitably locked thereto, in a manner similar to the clamping means herein set forth.

From the foregoing description, it is thought to be obvious that a roller bearing constructed in accordance with my invention is of an extremely simple and comparatively inexpensive nature and is particularly well adapted for use by reason of the convenience with which it may be applied in operative position and of the minimum amount of friction afforded between the parts, and it will also be obvious from the foregoing description that my improved roller bearing is capable of some change and modification without material departure from the principles and scope of the invention and for this reason I do not wish to be understood as limiting myself to the precise arrangement and formation of the several parts, herein shown, in carrying out my invention in practice.

I claim:

In combination with a hub having its inner wall provided with longitudinally directed channels, rollers mounted in the channels and extended within the bore of the hub, said rollers being provided with annular grooves at substantially their longitudinal centers, segmental race members positioned within the bases of the channels of the hub and disposed transversely thereof, such members having their extremities provided with inwardly directed projections, such members being wholly confined within the channels, and spherical bodies carried by the race members and projecting within the annular grooves of the rollers.

In testimony whereof I hereunto affix my signature in the presence of two witnesses.

FRANK CARYLE SEAMAN.

Witnesses:
 E. E. APLAUALP,
 CHAS. F. FARMER.